United States Patent [19]

Englehardt

[11] Patent Number: 4,724,568
[45] Date of Patent: Feb. 16, 1988

[54] INTEGRALLY FORMED SCOURING PAD AND SCRAPER ARRANGEMENT

[76] Inventor: Bernard Englehardt, 51 Abbeywood Trail, Don Mills, Ontario, Canada, M3B 3B4

[21] Appl. No.: 941,345

[22] Filed: Dec. 15, 1986

[51] Int. Cl.⁴ ............................................. A47L 13/02
[52] U.S. Cl. ....................................... 15/118; 15/105; 156/251
[58] Field of Search ............ 15/105, 118, 224, 209 B, 15/209 R; 156/250, 251

[56] References Cited

U.S. PATENT DOCUMENTS

| | | |
|---|---|---|
| 2,715,745 | 8/1955 | Jacobsen . |
| 3,038,187 | 6/1962 | Nathanson . |
| 3,849,225 | 11/1974 | Haertle ............................. 15/118 X |
| 4,015,306 | 4/1977 | Fenster . |
| 4,287,633 | 9/1981 | Gropper . |

FOREIGN PATENT DOCUMENTS 1189547  3/1959  France ............................. 15/209 B

*Primary Examiner*—Chris K. Moore
*Attorney, Agent, or Firm*—Fleit, Jacobson, Cohn & Price

[57] ABSTRACT

A longitudinally extending pad of a rubbery, compressible, water-absorbent material is covered with a knit fabric to provide an abrasive surface. A scraper is formed integrally at one end of the pad by applying heat and pressure to the one end to compress and harden the one end. Thus, the scraper, which comprises an elongated extension of the pad, is thin edged and relatively rigid.

19 Claims, 3 Drawing Figures

INTEGRALLY FORMED SCOURING PAD AND SCRAPER ARRANGEMENT

BACKGROUND OF INVENTION

1. Field of the Invention

The invention relates to an integrally formed scouring pad and scraper arrangement.

The invention also relates to a method for forming such an integrated arrangement.

2. Description of Prior Art

It is known in the art to provide a scouring pad and scraper arrangement as illustrated in, for example, U.S. Pat. No. 2,715,745, Jacobsen, Aug. 23, 1955. In Jacobsen, the scraper 11 is formed of a material different from the material of the scouring pad 10. In addition, the scraper is adhesively attached to the scouring pad. Thus, in forming the arrangement in Jacobsen, it is necessary to form two different parts and then to adhesively secure them in a third, separate forming step.

It is also known in the art to provide scouring pads of a sponge-like or synthetic material with a covering knit fabric material. The covering knit fabric material may also be a synthetic material which is heat sealable as is taught in, for example, U.S. Pat. Nos. 3,038,187, Nathanson, June 12, 1962, 4,015,306, Fenster, Apr. 5, 1977 and 4,287,633, Gropper, Sept. 8, 1981. Although the pads illustrated in these patents do teach the use of a sponge-like material covered by an abrasive material, none of the patents teach a scraper associated with the scouring pads.

SUMMARY OF INVENTION

It is therefore an object of the invention to provide an integrally formed scouring pad and scraper arrangement.

It is also an object of the invention to provide a method for forming the integrally formed arrangement.

In accordance with the invention, there is provided an arrangement comprising a longitudinally extending pad with a knit fabric covering. A scraper is integrally formed with the pad at one end thereof and comprises an elongated extension of the pad.

The integrated arrangement is formed by applying heat and pressure at one end of the pad to form the scraper. The material subject to heat and pressure is compressed and hardened to form a thin edged, rigid scraper.

In a preferred embodiment of the method, there is provided a strip of pad material, and the heat and pressure are applied at equal intervals therealong. Each interval is equal to the length of an integrally formed arrangement.

BRIEF DESCRIPTION OF DRAWINGS

The invention will be better understood by an examination of the following description, together with the accompanying drawings, in which.

DESCRIPTION OF PREFERRED EMBODIMENTS

Figure 1:
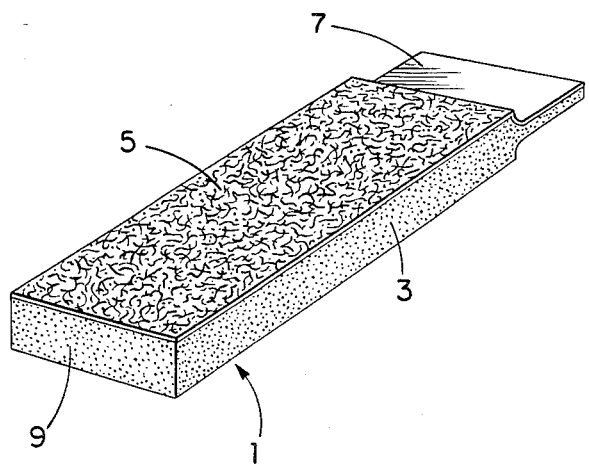
FIG. 1 is a perspective view of an embodiment of the invention.

An arrangement in accordance with the invention, illustrated generally at 1 in FIG. 1, comprises a longitudinally extending pad 3 made of a rubbery, compressible, water-absorbent material, such as natural or synthetic sponge, or synthetic foams such as elastomeric foam, polyurethane foam, etc. A knit fabric abrasive material 5 is placed on one or more of the outer surfaces of the pad. Thus, the knit fabric 5 may be placed on one surface as in the '187 patent referred to above, or it may be placed on all surfaces as in the '633 patent. The knit fabric 5 may also comprise a synthetic material.

A scraper 7, which is integrally formed with the pad 3, extends from one end of the pad and comprises an elongated extension of the pad. The arrangement as illustrated in FIG. 1 can be formed one at a time by simply applying heat and pressure at one end of a sized pad to form the scraper. The application of such heat and pressure will compress and harden the material to which the heat and pressure is applied. Thus, the hardened scraper will have a thin edge and will be relatively rigid.

Scrapers could be formed at both ends of the pad in accordance with the principles of the present invention. In addition, the scrapers could instead be formed at one, or both, sides of the pad.

Figure 2:
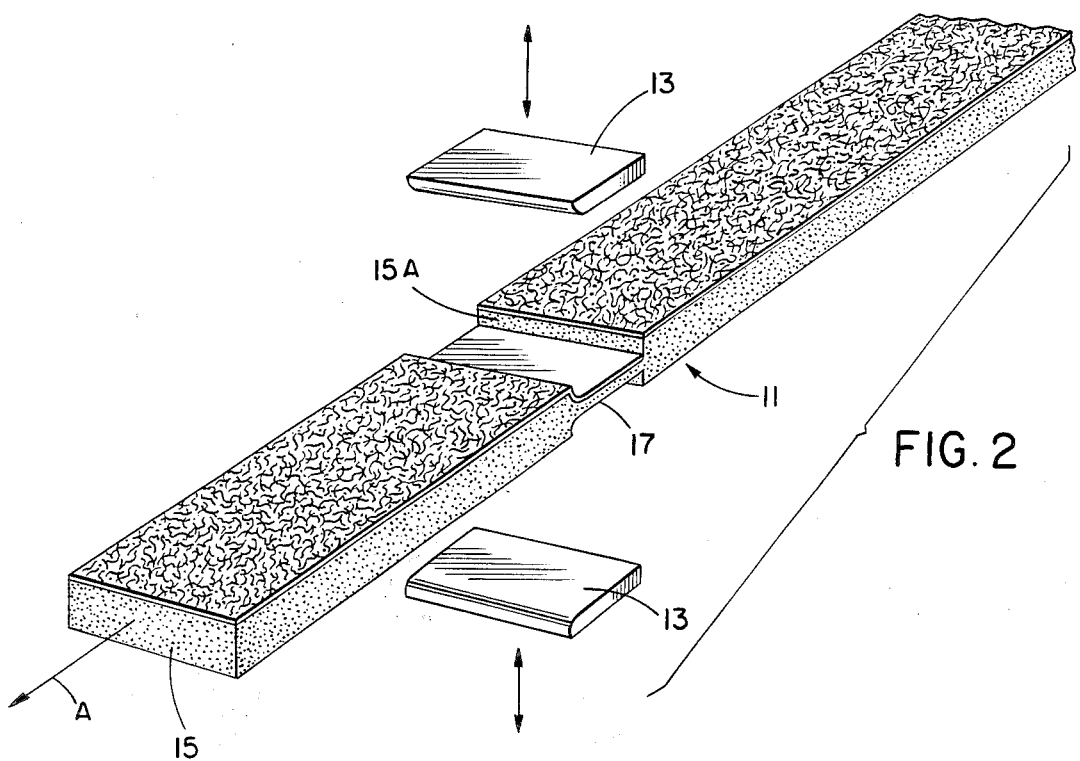
FIG. 2 illustrates a preferred method for forming a pad and scraper arrangement.

In a preferred embodiment, an elongated strip of pad material 11 (see FIG. 2) is driven, by means not shown, in the direction of arrow A. Means for heating and compressing, and subsequently severing, shown schematically at 13, are disposed at a heating and compression station and applied to the length at equal intervals therealong to form the scraper 17. A system for ensuring that the intervals at which the heat and pressure are applied are equal is well known in the art and requires no further description at this time.

The edge 15A adjacent the free edge of a scraper 17 forms the sealed end 15 of the following pad. Thus, the pad is heat sealed at one end and has an integrally formed scraper at the other end.

If it is desired to form scrapers at both ends, then the pads would be severed at the mid point of a scraper.

Figure 3:
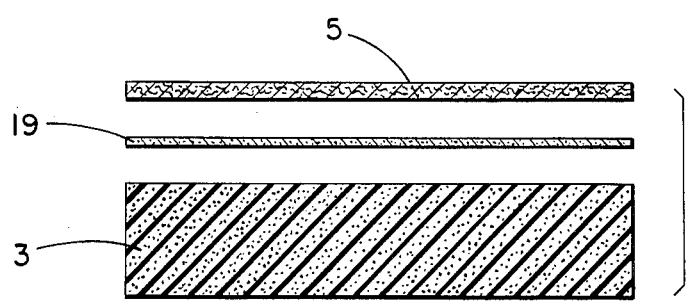
FIG. 3 illustrates an improvement to the pad illustrated in FIG. 1.

In the improvement illustrated in FIG. 3, a plastic film underlies the knitted fabric at least in the area of the scraper whereby to increase the rigidity of the scraper. As can be seen, a plastic film 19 is disposed between the pad 3 and the knitted fabric 5. The film can be disposed only in the area of the scraper. However, it is simpler, and therefore preferred, that the film underlie the knitted fabric along the full length of the pad. Thus, the film will also lend a certain amount of rigidity to the scouring surface of the pad.

In forming the pads in the above-described method, plastic film is placed on the elongated strip of pad material as above-discussed. The entire strip is then covered with the knit fabric material, and the covered material is then processed as discussed in relation with FIG. 2.

The pad and scraper arrangement is thus inexpensively formed as it does not require the multiplicity of complex steps required for forming similar arrangements of the type shown in the '745 patent. In addition, there is no danger that the scraper will fall off due to failure of the adhesive material.

Although several embodiments have been described, this was for the purpose of illustrating, but not limiting, the invention. Various modifications, which will come readily to the mind of one skilled in the art, are within the scope of the invention as defined in the appended claims.

I claim:

1. An integrally formed scouring pad and scraper arrangement, comprising:
   a longitudinally extending pad of a rubbery, compressible, water-absorbent material;
   a knit fabric covering said pad;
   an integrally formed scraper at one end of said pad formed by applying heat and pressure at said one end to compress and harden said one end, said scraper comprising an elongated extension of said pad;
   whereby, the scraper comprises a thin edged, rigid portion of said pad.

2. An arrangement as defined in claim 1 and including a plastic film between said longitudinally extending pad and said knit fabric covering;
   whereby, to increase the rigidity of said scraper.

3. An arrangement as defined in claim 2 wherein said knit fabric is heat sealed to said longitudinally extending pad at the other end of said longitudinally extending pad.

4. An arrangement as defined in claim 3 wherein said material of said longitudinally extending pad comprises a natural sponge material.

5. An arragement as defined in claim 3 wherein said material of said longitudinally extending pad comprises a synthetic sponge material.

6. An arrangement as defined in claim 3 wherein said material of said longitudinally extending pad comprises a synthetic foam material.

7. An arrangement as defined in claim 3 wherein said knit fabric covering comprises a synthetic material.

8. A process for forming an integrally formed pad and scraper arrangement, comprising:
   providing a longitudinally extending pad of a rubbery, compressible, water-absorbent material;
   applying a covering of a knit fabric to said pad;
   applying heat and pressure at at least one end of said pad;
   whereby, to compress and harden the material at the at least one end to form thereat a thin-edged, rigid scraper which is integrally formed with said longitudinally extending pad and comprises an elongated extension thereof.

9. A process as defined in claim 8 and including the step of applying a plastic film layer on said longitudinally extending pad before applying said knit fabric covering;
   whereby, said plastic film is disposed between an outer surface of said longitudinally extending pad and said knit fabric covering.

10. A process as defined in claim 9 wherein said knit fabric is heat sealed to said longitudinally extending pad at the other end of said longitudinally extending pad.

11. A process as defined in claim 10 wherein said material of said longitudinally extending pad comprises a natural sponge material.

12. A process as defined in claim 10 wherein said material of said longitudinally extending pad comprises a synthetic sponge material.

13. A process defined in claim 10 wherein said material of said longitudinally extending pad comprises a synthetic foam material.

14. A process for forming an integrally formed pad and scraper arrangement from an elongated strip of a rubbery, compressible, water-absorbent material, comprising:
    applying a covering of a knit fabric to said strip;
    applying heat and pressure to said covered strip at equal intervals therealong;
    whereby, to compress and harden the material at said intervals to thereby form equal length arrangements having thin edged, rigid scrapers at at least one end of each arrangement;
    the material between intervals comprising the pads of the arrangement;
    the scraper of each arrangement being integrally formed with the pad of its respective arrangement and comprising an elongated extension thereof.

15. A process as defined in claim 14 and including the step of applying a plastic film on said strip before applying said covering of a knit fabric;
    whereby, a plastic film is disposed between said strip and said knit fabric.

16. A process as defined in claim 15 wherein said knit fabric is heat sealed to said longitudinally extending pad at the other end of said longitudinally extending pad.

17. A process as defined in claim 16 wherein said material of said longitudinally extending pad comprises a natural sponge material.

18. A process as defined in claim 16 wherein said material of said longitudinally extending pad comprises a synthetic sponge material.

19. A process defined in claim 16 wherein said material of said longitudinally extending pad comprises a synthetic foam material.

* * * * *